(12) United States Patent
McDaniel et al.

(10) Patent No.: US 10,202,531 B2
(45) Date of Patent: Feb. 12, 2019

(54) WELLBORE METHODS EMPLOYING PRECIPITATED PARTICLES

(71) Applicant: Halliburton Energy Services, Inc., Houston, TX (US)

(72) Inventors: Cato Russell McDaniel, The Woodlands, TX (US); Xiangnan Ye, Cypress, TX (US); Dale E. Jamison, Humble, TX (US); Katerina Newman, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 87 days.

(21) Appl. No.: 14/906,353

(22) PCT Filed: Nov. 5, 2015

(86) PCT No.: PCT/US2015/059158
§ 371 (c)(1),
(2) Date: Jan. 20, 2016

(87) PCT Pub. No.: WO2017/078713
PCT Pub. Date: May 11, 2017

(65) Prior Publication Data
US 2017/0253784 A1    Sep. 7, 2017

(51) Int. Cl.
*C09K 8/03*    (2006.01)
*C04B 24/10*    (2006.01)
(Continued)

(52) U.S. Cl.
CPC ............ *C09K 8/032* (2013.01); *C04B 24/10* (2013.01); *C04B 26/02* (2013.01); *C04B 28/02* (2013.01);
(Continued)

(58) Field of Classification Search
None
See application file for complete search history.

(56) References Cited

U.S. PATENT DOCUMENTS 2,188,663 A * 1/1940 McClure ............... C01F 11/183
106/465
4,378,276 A * 3/1983 Liggett .................. C02F 1/463
205/751
(Continued)

FOREIGN PATENT DOCUMENTS

WO    2005118742 A2    12/2005

OTHER PUBLICATIONS

The Rheology of Suspensions of Solid Particles, Proceedings of the Royal Society A, vol. 466: 1201-1228 (2010).
(Continued)

*Primary Examiner* — Anuradha Ahuja
(74) *Attorney, Agent, or Firm* — Tenley Krueger Tumey L.L.P.

(57) ABSTRACT

Precipitated particles may be formed under conditions that provide a particle morphology suitable for conveying a desired set of properties to a wellbore circulation fluid. Methods for using precipitated particles in a wellbore may comprise: selecting precipitation conditions for producing precipitated particles that are substantially non-spherical in shape, are about 1 micron or under in size, or any combination thereof; forming the precipitated particles from a reaction mixture under the precipitation conditions without using a polymeric dispersant; and introducing a wellbore circulation fluid comprising a plurality of the precipitated particles into a wellbore penetrating a subterranean formation. The precipitation conditions may include one or more of modulating various reaction conditions, applying an (Continued)

electric field to the reaction mixture, or including a carbohydrate-based material in the reaction mixture.

17 Claims, 8 Drawing Sheets

(51) Int. Cl.
E21B 21/00 (2006.01)
E21B 33/14 (2006.01)
C04B 26/02 (2006.01)
C04B 28/02 (2006.01)
C04B 40/00 (2006.01)
C09K 8/48 (2006.01)
C09K 8/528 (2006.01)
C09K 8/56 (2006.01)
C09K 8/62 (2006.01)
C09K 8/74 (2006.01)

(52) U.S. Cl.
CPC ............ *C04B 40/0007* (2013.01); *C09K 8/03* (2013.01); *C09K 8/48* (2013.01); *C09K 8/528* (2013.01); *C09K 8/56* (2013.01); *C09K 8/62* (2013.01); *C09K 8/74* (2013.01); *E21B 21/003* (2013.01); *E21B 33/14* (2013.01)

(56) References Cited

U.S. PATENT DOCUMENTS

| | | | |
|---|---|---|---|
| 5,110,484 A | 5/1992 | Sheu et al. | |
| 5,332,564 A * | 7/1994 | Chapnerkar | C01F 11/183 106/464 |
| 6,228,249 B1 * | 5/2001 | Drummond | C01F 11/02 205/480 |
| 7,238,331 B2 * | 7/2007 | Zhou | B82Y 30/00 423/1 |
| 8,168,569 B2 | 5/2012 | Ballard et al. | |
| 8,562,839 B2 * | 10/2013 | Cho | C02F 1/4602 210/748.01 |
| 8,598,096 B2 | 12/2013 | Ballard et al. | |
| 2003/0121861 A1 | 7/2003 | Cho et al. | |
| 2005/0256300 A1 * | 11/2005 | Garetz | B01D 9/005 530/300 |
| 2008/0248350 A1 * | 10/2008 | Little | C25B 1/04 429/443 |
| 2009/0186781 A1 * | 7/2009 | Zhang | C09K 8/032 507/140 |
| 2010/0009874 A1 * | 1/2010 | Ballard | C09K 8/03 507/118 |
| 2013/0134053 A1 * | 5/2013 | Musson | A61N 1/0408 205/701 |
| 2013/0256939 A1 * | 10/2013 | Devenney | C04B 7/345 264/115 |
| 2014/0209290 A1 | 7/2014 | Jamison et al. | |
| 2014/0209307 A1 * | 7/2014 | Jamison | E21B 43/16 166/292 |
| 2014/0209386 A1 | 7/2014 | Jamison et al. | |
| 2014/0209387 A1 | 7/2014 | Jamison et al. | |
| 2014/0209388 A1 | 7/2014 | Jamison et al. | |
| 2014/0209390 A1 | 7/2014 | Jamison et al. | |
| 2014/0209392 A1 | 7/2014 | Jamison et al. | |
| 2014/0209393 A1 | 7/2014 | Jamison et al. | |
| 2014/0213488 A1 | 7/2014 | Jamison et al. | |
| 2014/0303047 A1 | 10/2014 | McDaniel et al. | |
| 2014/0367091 A1 * | 12/2014 | Tour | C09K 8/032 166/250.01 |
| 2015/0369949 A1 * | 12/2015 | Cuevas | G01V 3/26 324/338 |

OTHER PUBLICATIONS

International Search Report and Written Opinion for PCT/US2015/059158 dated Jan. 4, 2016.

Control of Barite Morphology by Double-Hydrophilic Block Copolymers, Limin Qi, Helmut Colfen and Markus Antonietti, Max Planck Institute of Colloids and Interfaces, Chem. Mater. 2000, 12, 2392-2403.

The Effect of Particle Shape on Suspension Viscosity and Implications for Magmatic Flows, Geophysical Research Letters, vol. 38: L13316 (2011).

Effect of Particle Shape on Unconfined Yield Strength, Powder Technology, vol. 194: 246-251 (2009).

Growth Morphology of Sucrose Crystals: The Role of Glucose and Fructose as Habit-Modifiers, G. Sgualdinoa, D. Aquilanob, G. Vaccaria, G. Mantovania, A. Salamoneb, DOI: 10.1016/S0022-0248(98)00414-X, 1998.

* cited by examiner

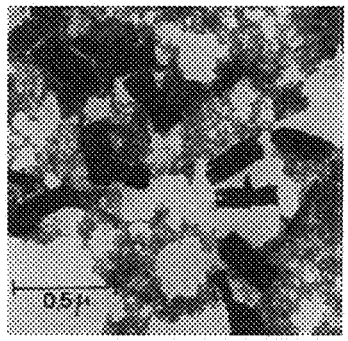
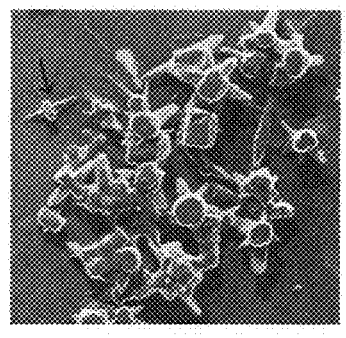
FIGURE 5A  FIGURE 5B
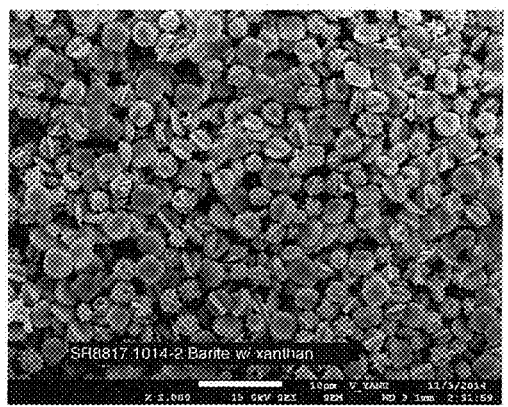
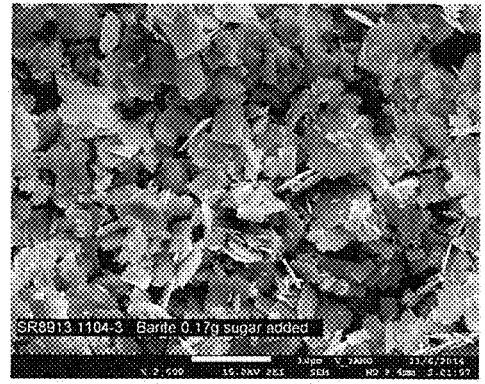
FIGURE 6A  FIGURE 6B
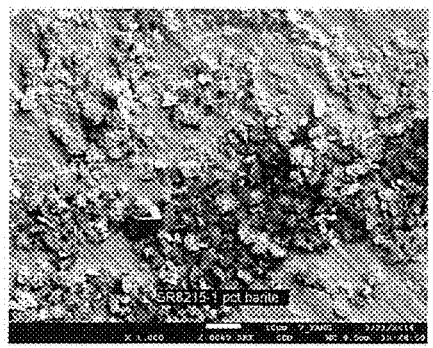
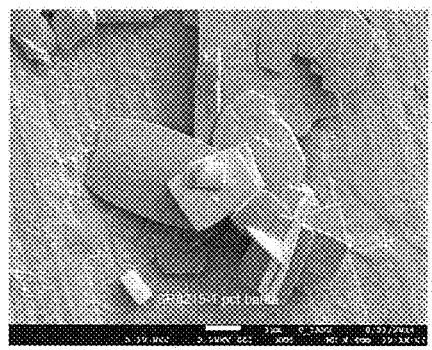
FIGURE 7A  FIGURE 7B

US 10,202,531 B2

WELLBORE METHODS EMPLOYING PRECIPITATED PARTICLES

BACKGROUND

The present disclosure generally relates to precipitated particles having tailored properties and, more specifically, to wellbore circulation fluids containing such precipitated particles and methods for use thereof.

Treatment fluids can be used in a variety of subterranean treatment operations. Such treatment operations can include, without limitation, drilling operations, cementing operations, stimulation operations, production operations, remediation operations, sand control treatments, and the like. As used herein, the terms "treat," "treatment," "treating," and grammatical equivalents thereof will refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, primary cementing operations, secondary cementing operations, fracturing operations, gravel packing operations, acidizing operations, scale dissolution and removal operations, sand control operations, consolidation operations, and the like. Treatment fluids used in conjunction with a treatment operation may also be referred to equivalently herein as "wellbore circulation fluids."

Wellbore circulation fluids frequently contain one or more types of particulate materials intended to assist the fluid in performing its intended function. Non-limiting functions of particulate materials within a wellbore circulation fluid may include, for example, densifying the fluid, propping fractures within the subterranean formation matrix, forming a filter cake to promote fluid loss control, and the like. When used for densification purposes, the particulate materials may be referred to as "weighting particles."

Weighting particles are frequently incorporated within wellbore circulation fluids to provide densification, particularly when the wellbore circulation fluid's density needs to be increased beyond that possible with a brine carrier fluid alone or any other type of carrier fluid. Maintaining sufficient density can be critical in order to perform various types of subterranean treatment operations successfully. During drilling operations, for example, a wellbore circulation fluid's density must be high enough to exert sufficient pressure on the walls of the wellbore to prevent blowouts from occurring. However, the hydrostatic pressure may need to be limited in order to reduce the possibility of instigating damage within the surrounding subterranean formation matrix. In another non-limiting example, the density of a spacer fluid may need to be regulated to limit its mixing with other fluids introduced before or after the spacer fluid (e.g., a drilling fluid or a cementing fluid). The amount and native density of the weighting particles may collectively determine the ultimate density of the wellbore circulation fluid. The shape of the weighting particles, in turn, may influence their native density.

In addition to their densification function, weighting particles may similarly impact the rheological performance of a wellbore circulation fluid, including the sag, viscosity, and yield strength of the fluid, for example. As used herein, the term "sag" will refer to vertical inhomogeneity in the density of a wellbore circulation fluid due to particle settling. Sag can occur when a wellbore circulation fluid is static or being circulated and can result from the combination of secondary flow and gravitational forces, for example. If settling is prolonged, density of the wellbore circulation fluid in the upper part of the wellbore can decrease below acceptable levels and result in a loss of hydrostatic pressure. As with densification effects, the shape of weighting particles may similarly influence their ability to alter a fluid's rheological performance in a desired manner. The native particle shape of weighting particles may likewise affect their fluid loss control performance. Undesired rheological or fluid loss control performance can be problematic for a number of reasons, including potential failure of a subterranean treatment operation or instigation of formation matrix damage.

Conventional weighting particles often comprise various types of high-density commodity materials, such as ground minerals. Optionally, sieving or a similar technique may be conducted to limit a ground mineral to a chosen range of particle sizes. Ground barite, a mineral comprising predominantly barium sulfate, is a representative example of a conventional weighting particle. However, many other types of weighting particles prepared from ground minerals will be familiar to one having ordinary skill in the art and may be selected for a given application. For example, a particular type of weighting particle and an amount thereof may be chosen to be chemically compatible with the conditions present in a wellbore and to provide a desired degree of fluid densification, among other factors.

Grinding techniques are frequently limited in the breadth of particle shapes that can be produced from a mineral source. Not only are particle shapes limited, but the baseline physical and chemical properties of native mineral compositions themselves represent essentially fixed features with ground mineral particles. Accordingly, if a weighting particle formed from a ground mineral does not convey a desired set of properties to a wellbore circulation fluid, there may be few options available other than utilizing an entirely different type of weighting particle altogether, which may not be a viable solution in some circumstances. For example, cost, sub-optimal performance, and/or chemical incompatibilities may preclude the use of an alternative weighting particle type.

As a further difficulty, high-quality sources of barite and other native minerals are becoming less and less readily available at a reasonable cost. Lower-quality barite sources, for example, may contain inclusions that are not barium sulfate. These inclusions may undesirably alter the barite's properties, increase abrasiveness (e.g., quartz and related inclusions), and lower the barite's density compared to that obtained from higher-quality barite sources. As a result, ground barite weighting particles obtained from lower-quality sources may not perform as this material has historically under similar wellbore conditions and/or in like-formulated wellbore circulation fluids. Similar difficulties may be encountered with other types of ground-mineral weighting particles. Accordingly, conventional reliance on ground-mineral weighting agents can make a well operator's job exceedingly complex and provide limited opportunities for tailoring a wellbore circulation fluid to a given set of circumstances.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

FIGS. 5A and 5B show the effects of altering the reaction pH when precipitating iron oxides in the presence of a carbohydrate-based material.

FIGS. 6A and 6B show the effects of precipitating barium sulfate in the presence of a carbohydrate-based material.

FIGS. 7A-7F show illustrative effects of forming precipitated particles in the presence of an applied AC electric field.

DETAILED DESCRIPTION

Figure 1:
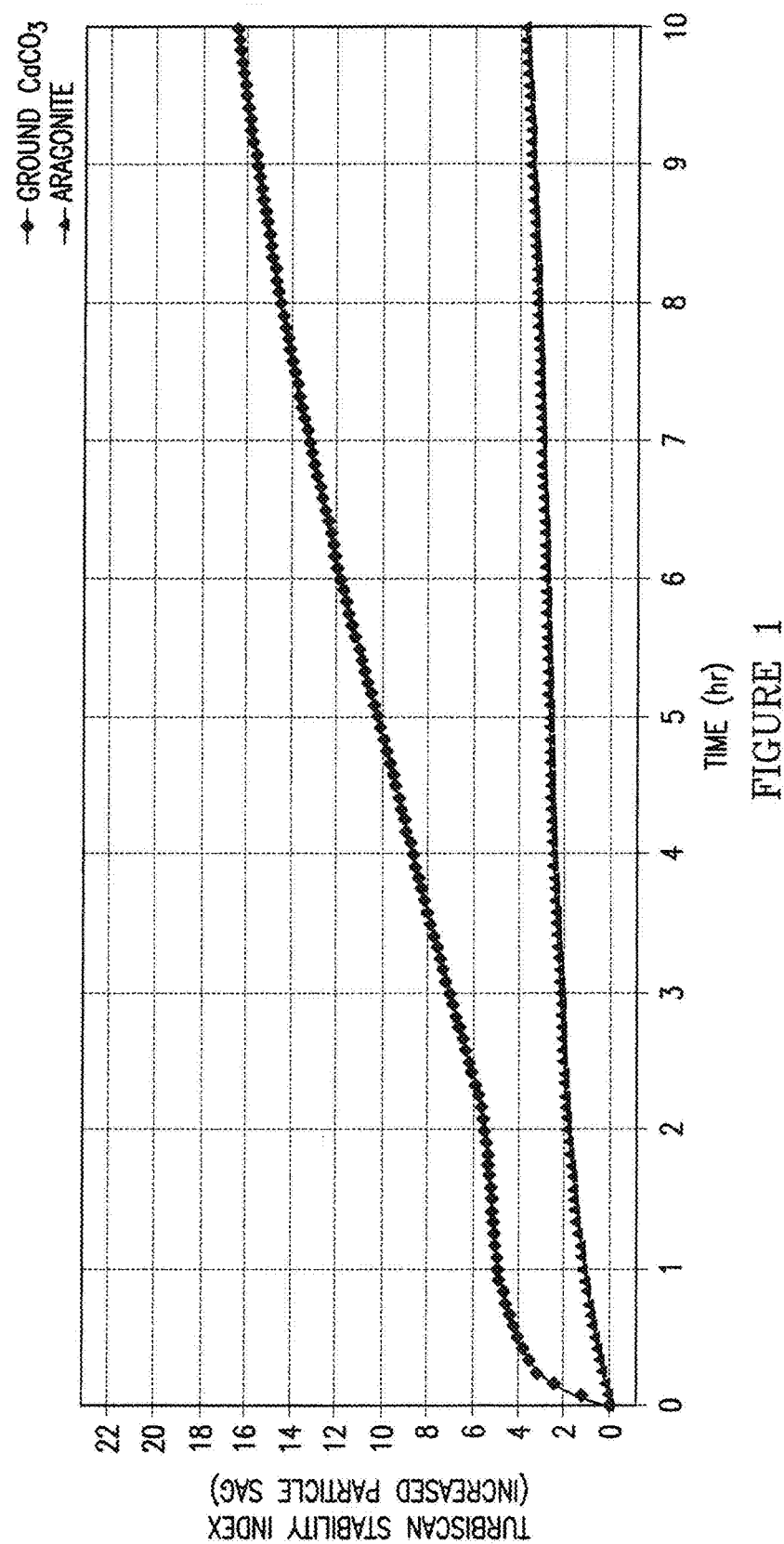
FIG. 1, for example, shows an illustrative plot of particle sag as a function of time for acicular calcium carbonate crystals (aragonite) compared to ground calcium carbonate.

The present disclosure generally relates to precipitated particles having tailored properties and, more specifically, to wellbore circulation fluids containing such precipitated particles and methods for use thereof.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, mineral-grinding processes offer only a minimal degree of tailoring to be realized when producing ground particles. Grinding processes usually produce only a set particle shape (often substantially spherical) with a broad size range, neither of which may be sufficient for producing a wellbore circulation fluid having a desired set of properties (e.g., density, rheological performance, and the like). Sieving of ground particles may be conducted to narrow the particle size distribution, but this still may not produce particles having desired performance characteristics. Spherical particles, in particular, may be rather undesirable from a rheological standpoint, since they may be prone to settling and inducing sag in a wellbore circulation fluid. In addition, inherent limitations in the quality of a mineral source itself can detrimentally impact the properties of ground mineral particles and wellbore circulation fluids formed therefrom. Grinding and sorting processes offer substantially limited opportunities for addressing a poor-quality mineral source.

Precipitation processes may be employed as an alternative to grinding and optional sorting processes to produce weighting particles that differ significantly in their morphology and quality. Particles formed under a chosen set of precipitation conditions will be referred to herein as "precipitated particles." Precipitated particles may have significantly different shapes and sizes compared to those produced during grinding processes, which may be desirable during the formulation and use of such particles in wellbore circulation fluids. In addition, by altering the conditions under which a precipitation reaction is conducted, differing particle shapes and sizes may be produced, thereby offering further opportunities for tailoring the properties of a wellbore circulation fluid.

The present inventors discovered various precipitation techniques whereby precipitated particles may be produced in bulk from readily available materials, where the precipitated particles have a morphology that may be altered by adjusting the precipitation conditions. Depending on the chosen precipitation conditions, the precipitated particles may be substantially non-spherical in shape and/or be about 1 micron or under in size, both of which may be desirable when formulating a wellbore circulation fluid. For example, such precipitated particles may be more resistant to particle sag than are other types of particles. Advantageously, at least some of the precipitation techniques discovered by the inventors may be conducted without using a dispersant, particularly a polymeric material, during the precipitation reaction to control the particle morphology, which may be highly desirable from an environmental and cost standpoint when utilizing the precipitated particles in a wellbore circulation fluid. In addition, polymeric dispersants and other types of surface-active materials may alter the surface chemistry of the particles, thereby creating unpredictable negative effects on their reactivity and their rheological performance in a wellbore circulation fluid and/or the subterranean formation into which the fluid is introduced. Despite their disadvantages, many conventional precipitation techniques utilize polymeric materials or related crystal growth modifiers when forming precipitated particles with an altered particle morphology compared to the typically favored crystalline form.

More specifically, the inventors discovered techniques whereby the shape and/or particle size distribution of precipitated particles may be altered in the absence of a polymeric dispersant, for example, by adjusting any combination of pH, temperature, reactant concentration, order of reactant addition, rate of reactant addition, electric field application, and/or addition of environmentally friendly, non-polymeric crystal growth modifiers. By adjusting these parameters, the inventors discovered that precipitated particles having desirable properties may be produced, such as precipitated particles that are substantially non-spherical in shape and/or are about 1 micron or under in size. In non-limiting embodiments, the precipitation conditions may be selected such that the precipitated particles have a shape selected from among ovular- or substantially ovular-shaped, discus-shaped, platelet-shaped, flake-shaped, snowflake-shaped, toroidal-shaped, dendritic-shaped, needle-shaped (acicular-shaped), rod-shaped, prismatic-shaped, or spiked variants of any of these shapes (appearance similar to that of a sea urchin, see FIG. 2B, for example). In turn, wellbore circulation fluids incorporating such precipitated particles can be desirable due to enhancement of their properties and downhole performance compared to those containing substantially spherical particles of like type. For example, wellbore circulation fluids incorporating such precipitated particles may display decreased sag and enhanced density, rheology and fluid loss performance compared to fluids containing substantially spherical particles. Moreover, precipitated particles such as precipitated barite can be recovered from drilling fluids and be recycled, thereby further reducing the environmental impact of mining and drilling operations.

As a further advantage, precipitated particles formed according to the disclosure herein may be higher purity and provide a more consistent morphology compared to that obtained by grinding a bulk mineral. Accordingly, precipitated particles produced according to the present disclosure may exhibit a decreased degree of batch-to-batch performance variance when formulated in a wellbore circulation fluid. As yet another advantage, the disclosed precipitation methods may provide particles at a lower cost and with a reduced ecological footprint compared to grinding methods, due to the expense and environmental issues associated with mining operations needed to source a native mineral.

Still further, precipitation processes may advantageously circumvent impurities present in a native mineral source by utilizing high-purity reactants to precipitate substantially pure precipitated particles. Alternately, precipitated particles may be combined with ground mineral particles to "dilute" an undesired impurity component in the ground mineral particles and improve the overall purity profile of the combined particles. Hence, in some embodiments, precipitated particles may be used to bring ground mineral particles into an acceptable specification (e.g., abrasiveness, impurity content and the like) for use in a wellbore circulation fluid. Again, the precipitated particles may convey a property to the wellbore circulation fluid that is not produced by ground mineral particles of differing morphology, thereby allowing tailoring of the wellbore circulation fluid's properties to be realized. Further, by utilizing precipitated particles that differ from a ground mineral primarily in their morphology, rather than in their predominant chemical makeup, a decreased incidence of unexpected chemical incompatibilities may be realized than if ground mineral particles are replaced with another type of particle entirely.

In a further extension, the precipitation techniques of the present disclosure may allow the properties of ground mineral particles to be enhanced compared to that of a native mineral source. Specifically, the inventors discovered that by utilizing ground mineral particles as precipitation seeds (i.e., seed particles), an additional coating of the same predominant chemical component may be precipitated thereon, thereby enhancing the particle quality compared to that of the original ground mineral particles. For example, a surface coating may reduce abrasiveness (e.g., due to sand particles or like quartz inclusions) or chemical incompatibilities that may occur when a low-quality mineral source is employed. Since a low-quality seed particle may be buried within the interior of a precipitated particle beneath a surface coating, it may have a limited impact on the precipitated particle's chemical and physical properties. For example, a low-quality mineral seed (e.g., barite particles) may only marginally impact the overall particle density once a barium sulfate surface coating has been formed thereon, thereby allowing low-quality mineral particles to be used as a weighting agent following their surface coating, when they might otherwise be unsuitable. As with other types of precipitated particles, precipitated particles produced on seed particles may provide wellbore circulation fluids with enhanced properties and/or a decreased likelihood of encountering unexpected chemical incompatibilities when formulating a wellbore circulation fluid.

In various embodiments, methods of the present disclosure may comprise: selecting precipitation conditions for forming precipitated particles that are substantially non-spherical in shape, are about 1 micron or under in size, or any combination thereof; forming the precipitated particles from a reaction mixture under the precipitation conditions without using a polymeric dispersant; and introducing a wellbore circulation fluid comprising a plurality of the precipitated particles into a wellbore penetrating a subterranean formation. The precipitation conditions may include one or more of the following: i) modulating one or more of a temperature of the reaction mixture, a concentration of one or more reactants in the reaction mixture, and an order of addition of one or more reactants in the reaction mixture, ii) applying an electric field to the reaction mixture, or iii) including a carbohydrate-based material in the reaction mixture.

As discussed above, substantially non-spherical precipitated particles may provide a number of advantages in terms of modifying the density and rheological properties of a wellbore circulation fluid. For example, substantially non-spherical precipitated particles may provide for decreased particle sag, increased viscosity, increased yield strength, and increased fluid loss control when measured compared to a wellbore circulation fluid comprising an equivalent concentration of substantially spherical particles of like type. As used herein the term "like type" will refer to a particle composition having the same predominant chemical makeup as a precipitated particle, but with a differing morphology. The differing morphology may comprise a substantially spherical shape and/or a different particle size. The decreased particle sag of substantially non-spherical particles is believed to be due to their increased surface area relative to that of a sphere and correspondingly increased drag forces, as explained by Stokes law. FIG. 1, for example, shows an illustrative plot of particle sag as a function of time for acicular calcium carbonate crystals (aragonite) compared to ground calcium carbonate. Increased viscosity and increased yield strength may similarly be related to the particle surface area. Precipitated particles that are about 1 micron in size or under (i.e., nanoparticles) may provide similar effects when formulated into a wellbore circulation fluid due to their high surface area.

The wellbore circulation fluids of the present disclosure include a suitable carrier fluid in which the precipitated particles are dispersed. Examples of carrier fluids suitable for use in conjunction with the wellbore circulation fluids of the present disclosure include, but are not limited to, oil-based fluids, synthetic-based fluids, aqueous-based fluids, aqueous-miscible fluids, water-in-oil emulsions, and oil-in-water emulsions. Suitable oil-based fluids and synthetic-based fluids may include, for example, alkanes, cycloalkanes, branched alkanes, olefins, branched olefins, aromatic hydrocarbons, paraffins, diesel fluids, mineral oils, kerosenes, desulfurized hydrogenated kerosenes, emulsions thereof, and any combination thereof. Suitable aqueous-based fluids may include, for example, fresh water, saltwater (e.g., water containing one or more salts dissolved therein), brine (e.g., saturated salt water), seawater, emulsions thereof, and any combination thereof. Suitable aqueous-miscible fluids may include water-miscible organic solvents such as, for example, alcohols (e.g., methanol, ethanol, n-propanol, isopropanol, n-butanol, sec-butanol, isobutanol, and t-butanol); polyols; glycerins; glycols (e.g., polyglycols, propylene glycol, and ethylene glycol); polyglycol amines; any derivative thereof; and any combination thereof.

When the carrier fluid includes a salt, such as in a brine or an aqueous salt solution, suitable salts are not considered to be particularly limited. Suitable salts for use in conjunction with a brine or aqueous salt solution may include, for example, sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, or any combination thereof.

The wellbore circulation fluids may be formulated such that they have a suitable density for performing a desired function in the wellbore during a subterranean treatment operation. The density may be a function of the loading of precipitated particles and their chemical composition, the carrier fluid density, and density contributions from any additional components that are present in the carrier fluid. Overall, the wellbore circulation fluids may have a density between about 6 pounds per gallon (ppg) and about 50 ppg, depending upon whether an oil-based or water-based carrier fluid is used. Fresh water has a density of about 8.3 ppg at 20° C., and brines or salt solutions have a density values ranging from this value up to about 19 ppg, depending on the identity of the salt and its concentration. Oil-based carrier fluids, in contrast, typically have densities between about 7 and about 8.3. Hence, the density contribution of the precipitated particles may range from as little as about 1 ppg upwards to about 43 ppg, or any subrange in between. In more particular embodiments, the wellbore circulation fluids may have an overall density between about 9 ppg and about 17 ppg, or between about 12 ppg and about 22 ppg, or between about 15 ppg and about 30 ppg, or between about 22 ppg and about 40 ppg, or between about 25 ppg and about 50 ppg. One of ordinary skill in the art will be able to determine a desired density for a particular wellbore circulation fluid based upon its intended application upon introduction into a wellbore.

In various embodiments, the wellbore circulation fluids may comprise the precipitated particles in an amount up to about 70% of the wellbore circulation fluid by volume. In more particular embodiments, the wellbore circulation fluid may comprise about 5% to about 20% precipitated particles by volume, or about 10% to about 20% precipitated particles by volume, or about 20% to about 40% precipitated particles by volume, or about 25% to about 50% precipitated particles by volume, or about 40% to about 70% precipitated particles by volume, or about 10% to about 40% precipitated particles by volume. In some embodiments, non-precipitated particles may be present in combination with the precipitated particles, and the total particle content (precipitated particles and non-precipitated particles) may reside within the foregoing ranges.

One or more types of the precipitated particles may be included in the wellbore circulation fluid in order to obtain a desired set of properties. Without limitation, the wellbore circulation fluids of the present disclosure may comprise one type, two types, three types, or four or more types of precipitated particles. In some embodiments, multiple types of particles may be of the same predominant composition but have a different particle morphology and/or particle size. In other embodiments, multiple types of particles may be of differing predominant chemical compositions altogether. In still further embodiments, when two or more types of precipitated particles are present, the particle size distribution may be bimodal or higher. As used herein, the term "bimodal" will refer to the condition of a particle size distribution plot having two discrete local maxima.

The precipitated particles may vary over a wide range of sizes. In various embodiments, the precipitated particles may range between about 5 nm and about 100 microns in size. In more particular embodiments, the precipitated particles may range between about 10 nm and about 1 micron in size, or between about 50 nm and about 500 microns in size, or between about 100 nm and about 1 micron in size, or between about 500 nm and about 5 microns in size, or between about 1 micron and about 100 microns in size, or between about 1 micron and about 5 microns in size, or between about 5 microns and about 50 microns in size. In still other embodiments, larger precipitated particles, such as those between about 100 microns and about 10 mm in size, for example, may also be produced according to the disclosure herein. For example, precipitated particles ranging between about 500 microns and about 10 mm in size may be used as proppants or lost circulation materials.

Depending upon the intended function of the precipitated particles and the chemical conditions present in a given wellbore or wellbore circulation fluid, any number of precipitated particles may be chosen for production and use according to the disclosure herein. Non-limiting examples of precipitated particles that may be formed and utilized according to the disclosure herein may include, for example, $AgI$, $AgCl$, $AgBr$, $AgCuS$, $AgS$, $Ag_2S$, $Al_2O_3$, $AsSb$, $AuTe_2$, $BaCO_3$, $BaSO_4$, $BaCrO_4$, $BaO$, $BeO$, $BiOCl$, $(BIO)_2CO_3$, $BiO_3$, $Bi_2S_3$, $Bi_2O_3$, $CaO$, $CaF_2$, $CaWO_4$, $CaCO_3$, $(Ca,Mg)CO_3$, $CaO.SiO$ (calcium silicate), $CaSO_4$, $CdS$, $CdTe$, $Ce_2O_3$, $CoAsS$, $Cr_2O_3$, $CuO$, $Cu_2O$, $CuS$, $Cu_2S$, $CuS_2$, $Cu_9S_5$, $CuFeS_2$, $Cu_5FeS_4$, $CuS.Co_2S_3$, $Fe^{2+}Al_2O_4$, $Fe_2SiO_4$, $FeWO_4$, $FeAs_2$, $FeAsS$, $FeS$, $FeS_2$, $FeCO_3$, $Fe_2O_3$, $\alpha$-$Fe_2O_3$, $\alpha$-$FeO(OH)$, $Fe_3O_4$, $FeTiO_3$, $FePO_4$, $HgS$, $Hg_2Cl_2$, $MgO$, $MgO.SiO$ (magnesium silicate), $MnCO_3$, $Mn_2S$, $MnWO_4$, $MnO$, $MnO_2$, $Mn_2O_3$, $Mn_3O_4$, $Mn_2O_7$, $MnO(OH)$, $CaMoO_4$, $MoS_2$, $MoO_2$, $MoO_3$, $NbO_4$, $NiO$, $NiAs_2$, $NiAs$, $NiAsS$, $NiS$, $PbTe$, $PbSO_4$, $PbCrO_4$, $PbWO_4$, $PbCO_3$, $(PbCl)_2CO_3$, $Pb^{2+}_2Pb^{4+}O_4$, $Sb_2SnO_5$, $Sc_2O_3$, $SnO$, $SnO_2$, $SrO$, $SrCO_3$, $SrSO_4$, $TiO_2$, $UO_2$, $V_2O_3$, $VO_2$, $V_2O_5$, $VaO$, $Y_2O_3$, $YPO_4$, $ZnCO_3$, $ZnO$, $ZnFe_2O_4$, $ZnAl_2O_4$, $ZnS$, $ZrSiO_4$, $ZrO_2$, $ZrSiO_4$, and any combination thereof. In more particular embodiments, the precipitated particles may comprise barium sulfate, calcium carbonate, iron oxides, or any combination thereof. The precipitated particles may be heterogeneous and comprise two or more discrete domains, or they may be homogeneous and comprise substantially a single domain. In the case of precipitated particles comprising a surface coating precipitated upon a ground mineral, if the ground mineral and the surface coating are of the same predominant chemical compound, such precipitated particles should be considered to comprise multiple domains.

Various techniques for forming precipitated particles may comprise combining two or more reactants in a reaction mixture, and reacting the two or more reactants under suitable precipitation conditions that produce precipitated particles having the features described above. For example, in some embodiments, a first metal salt and a second metal salt may be combined in an aqueous medium and subjected to precipitation conditions that result in formation of the precipitated particles. Non-limiting examples of precipitatable cations that may comprise the first or second metal salt include, for example, silver, gold, barium, beryllium, bismuth, calcium, cadmium, cerium, cobalt, chromium, copper, iron, magnesium, manganese, molybdenum, niobium, nickel, lead, selenium, scandium, tin, strontium, titanium, uranium, vanadium, yttrium, zinc, zirconium, or any combination thereof. Non-limiting examples of precipitatable anions that may comprise the first or second metal salt include, for example, carbonate, fluoride, chloride, bromide, iodide, acetate, formate, citrate, molybdate, tungstate, vanadate, titanate, chromate, sulfate, hydroxide, phosphate, silicate, and any combination thereof.

In various embodiments, a concentration of the two or more reactants may range from about 1 mM to about 5 M, or from about 10 mM to about 5 M, or from about 50 mM to about 5 M, or from about 100 mM to about 5 M, or from about 500 mM to about 5 M, or from about 1 M to about 5 M, or from about 10 mM to about 1 M, or from about 50 mM to about 1 M, or from about 100 mM to about 1 M, or from about 500 mM to about 1 M.

In further embodiments, the wellbore circulation fluids of the present disclosure may further comprise additional components that are commonly used in wellbore circulation fluids. Suitable additional components may include, but are not limited to, filler particles, salts, inert solids, fluid loss control agents, emulsifiers, dispersion aids, corrosion inhibitors, emulsion thinners, emulsion thickeners, viscosifying agents, gelling agents, crosslinking agents, surfactants, cement particulates, proppants, gravel particulates, lost circulation materials, pH control additives, breakers, defoaming agents, biocides, stabilizers, scale inhibitors, gas hydrate inhibitors, oxidizers, reducers, friction reducers, clay stabilizing agents, set accelerators, set retarders, and any combinations thereof. One having ordinary skill in the art and the benefit of this disclosure will understand appropriate additional components and amounts thereof to include in a given wellbore circulation fluid intended for a particular application.

As discussed above, the inventors discovered that the growth morphology of precipitated particles may be modified through tailoring of the reaction conditions such that the precipitated particles are substantially non-spherical, are about 1 micron or under in size, or any combination thereof. Various techniques for modifying a reaction mixture to accomplish the foregoing are considered hereinafter. Desirably, in some embodiments, the techniques may be used to accomplish production of precipitated particles having the foregoing features without using a polymeric material acting as a dispersant. In alternative embodiments, however, a polymeric dispersant or like modifier of precipitate growth morphology may be present in the reaction mixture. One having ordinary skill in the art will be able to identify when a polymeric material acting as a dispersant or like modifier may be suitably utilized, based upon the precipitated particle morphologies that may be obtained under the chosen precipitation conditions and/or the intended use of the precipitated particles in a downstream application. For example, if a polymeric dispersant can be tolerated in a given wellbore circulation fluid and use of the polymeric dispersant helps better promote formation of a desired particle morphology, it may be suitably used.

As referenced above, the inventors discovered that the morphology of precipitated particles may be altered by modulating various conditions within the reaction mixture and/or how the reaction mixture is prepared. Specifically, in various embodiments, the morphology of the precipitated particles may be changed by modulating one or more of a temperature of the reaction mixture, a concentration of one or more reactants in the reaction mixture, and an order of addition of one or more reactants to the reaction mixture.

In some embodiments, the reaction mixture may comprise an aqueous solution of the first reactant and the second reactant. The temperature of the aqueous solution may range between about −15° C. and about 115° C., and the temperature may be modulated within this range to change the morphology of the precipitated particles. Similarly, the concentrations of the first reactant and the second reactant may be individually modulated within the ranges discussed above in order to produce precipitated particles that are substantially non-spherical in shape and/or that are about 1 micron or under in size. In still other embodiments, an order of addition of the first reactant and the second reactant to the reaction mixture may be modulated to alter the morphology of the precipitated particles. In some embodiments, the first reactant and the second reactant may be added to the reaction mixture at substantially the same time. In other embodiments, a first reactant may be added to the reaction mixture first, and a second reactant may be added to the reaction mixture subsequently. Likewise, the rate of addition of the first reactant and the second reactant may be adjusted to alter the morphology of the precipitated particles.

Figures 2A, 2B:
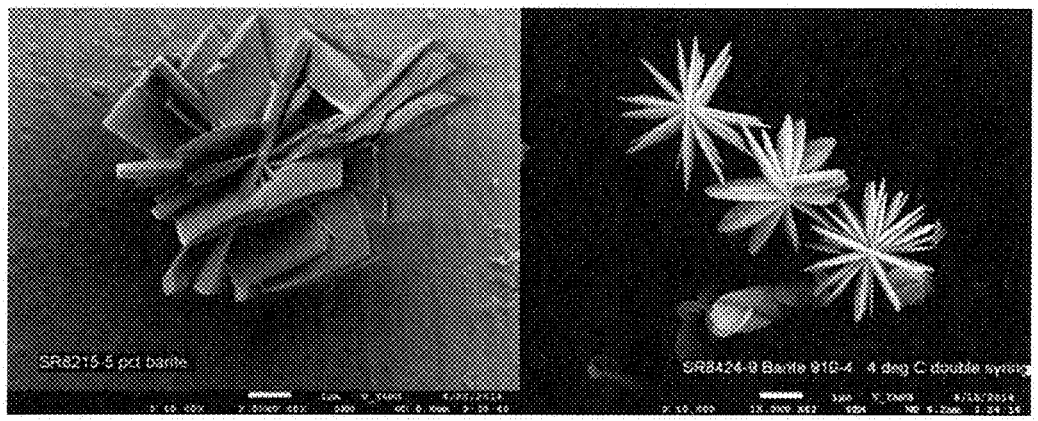
FIGS. 2A, 2B, 3A and 3B show the effects altering the reaction temperature when producing barium sulfate particles (FIGS. 2A and 2B) and calcium carbonate particles (FIGS. 3A and 3B).
Figures 3A, 3B:
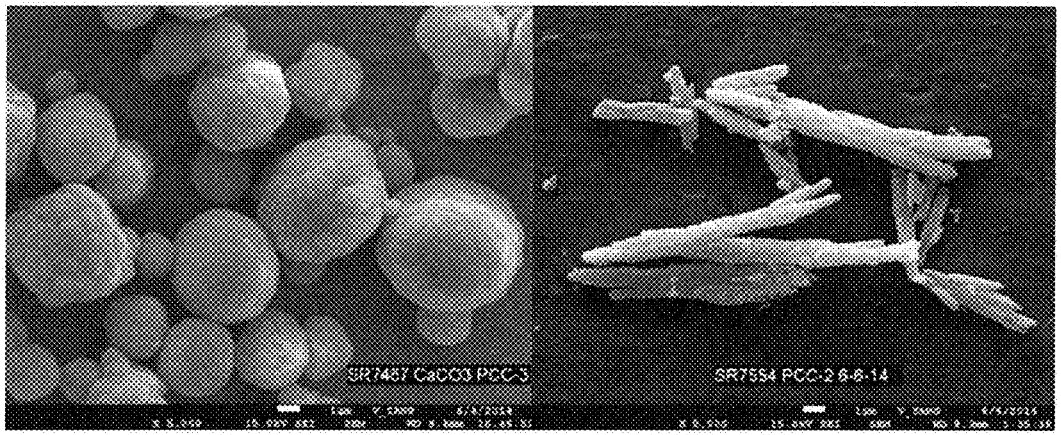
Figures 4A, 4B:
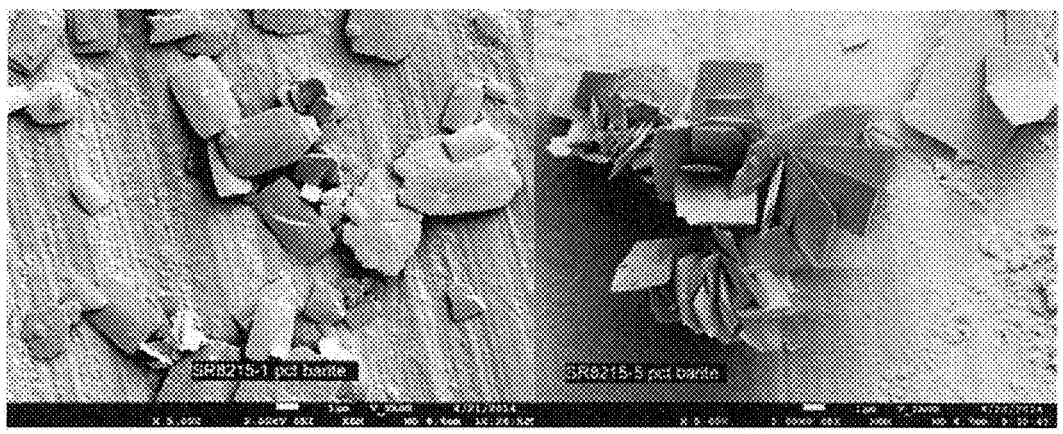
FIGS. 4A and 4B show the effects of altering the order of addition of reactants when producing barium sulfate particles.

For example, temperature and the order of addition of the first reactant and the second reactant may be used to alter the morphology of the precipitated particles. FIGS. 2A, 2B, 3A and 3B show the effects altering the reaction temperature when producing barium sulfate particles (FIGS. 2A and 2B) and calcium carbonate particles (FIGS. 3A and 3B). As shown in FIG. 2A, barium sulfate platelets were produced at a reaction temperature of about 25° C. (room temperature). FIG. 2B, in contrast, shows that spiked barium sulfate particles (resembling a sea urchin) were produced at a reaction temperature of 4° C. The opposite behavior was shown for calcium carbonate, wherein largely spherical particles were produced during a room temperature precipitation reaction (FIG. 3A), but acicular aragonite crystals were produced at a reaction temperature of 70° C. (FIG. 3B). FIGS. 4A and 4B show the effects of altering the order of addition of reactants when producing barium sulfate particles. In FIG. 4A, a sulfate solution was added to an aqueous barium solution, and individual platelets were produced. In contrast, in FIG. 4B, a barium solution and a sulfate solution were combined simultaneously to form barium sulfate particles with an altered morphology, resembling an agglomeration of edge-fused platelets.

In some or other embodiments of the present disclosure, the precipitated particles may be formed in the presence of a carbohydrate-based material. The carbohydrate-based material may impact the size and morphology of the precipitated particles that are obtained. The carbohydrate-based material may be included in the reaction mixture while the precipitated particles are being formed. As used herein, the term "carbohydrate-based material" will refer to a polymeric or non-polymeric substance comprising a saccharide unit.

Illustrative polymeric carbohydrate-based materials typically differ from polymeric dispersants in that the former are derived from biological source materials, rather than being formed largely from synthetic materials. Illustrative polymeric carbohydrate-based materials that may be used according to the present disclosure to adjust precipitation conditions in the course of producing precipitated particles with a desired morphology include, for example, cellulose, guar, xanthan, any derivative thereof, the like, and any combination thereof.

In more particular embodiments, the suitable carbohydrate-based materials may comprise a non-polymeric carbohydrate-based material such as a sugar, a sugar alcohol, a sugar acid, or any combination thereof. Dehydrosugar, dehydrosugar alcohol, or dehydrosugar acid variants may be used in a similar manner. Illustrative examples of each of these substances that may be used in the various embodiments of the present disclosure are discussed hereinafter.

Suitable sugars may that may be used in conjunction with the production of precipitated particles may include monosaccharides, disaccharides, trisaccharides, higher oligomers, and any combination thereof. Both the open-chain and closed-ring form of suitable sugars may be used. In more particular embodiments, suitable sugars that may be used to affect the morphology of precipitated particles include, for example, sucrose, lactose, fructose, glucose, maltose, and the like.

Suitable sugar alcohols may that may be used in conjunction with the production of precipitated particles may include, for example, mannitol, sorbitol, xylitol, glycerol, erythritol, arabitol, ribitol, dulcitol, iditol, isomalt, maltitol, lactitol, polyglycitol, any combination thereof, and any derivative thereof. In some embodiments, a suitable sugar alcohol can be joined to a monosaccharide or higher saccharide oligomer through a glycosidic bond to produce a hybrid carbohydrate-based material.

Suitable sugar acids may that may be used in conjunction with the production of precipitated particles may include, for example, glyceric acid, xylonic acid, gluconic acid, ascorbic acid, glucuronic acid, glacturonic acid, iduronic acid, tartaric acid, mucic acid, saccharic acid, erythorbic acid, any derivative thereof, any salt thereof, or any combination thereof. In some embodiments, a suitable sugar acid can be joined to a monosaccharide or higher saccharide oligomer through a glycosidic bond to produce a hybrid carbohydrate-based material.

In general, only small amounts of the carbohydrate-based material are needed in the reaction mixture in order to alter the morphology of the precipitated particles. In various embodiments, a concentration of the carbohydrate-based material in the reaction mixture may be between about $10^{-6}$ M and about 1 M. In more particular embodiments, the concentration of the carbohydrate-based material may be between about $10^{-6}$ M and about $10^{-3}$ M, or between about $10^{-4}$ M and about $10^{-2}$ M.

In some embodiments, the pH of the reaction mixture may lie between about 8 and about 12 when utilizing a carbohydrate-based material to alter the morphology of the precipitated particles.

FIGS. 5A and 5B show the effects of altering the reaction pH when precipitating iron oxides in the presence of a carbohydrate-based material. As shown in the image of FIG. 5A, a mixture of prismatic hematite crystals and ferrihydrite was produced at a pH of 10.1 in the presence of a $10^{-4}$ maltose concentration. In contrast, as shown in FIG. 5B, epitaxial twinned crystals of goethite were formed at a pH of 11.7 at an identical maltose concentration.

FIGS. 6A and 6B show the effects of precipitating barium sulfate in the presence of a carbohydrate-based material. The barium sulfate in FIG. 6A was precipitated in the presence of xanthan and had a median particle size of 2.65 microns. The $d_{90}$ particle size was 4.62 microns. When the experiment was repeated in the presence of sucrose, common table sugar, under identical conditions, the median particle size was 4.56 microns (FIG. 6B). The $d_{90}$ particle size was 8.63 microns. In an illustrative precipitation reaction, 1.25 mmol of $BaCl_2$ solution (2.5 mL of 0.5M solution) and $Na_2SO_4$ were added into 300 mL deionized water containing 0.17 g sugar or 0.2 g xanthan, with the precipitation reaction taking place at room temperature in both instances. In addition to different particle sizes being formed, the particle morphology also appeared to differ in the presence of the various carbohydrate-based materials, with cube-like precipitates being formed in the presence of xanthan and flakes or platelets being formed in the presence of sucrose.

In additional embodiments, methods for forming precipitated particles in the presence of a carbohydrate-based material may further comprise modulating one or more of a temperature of the reaction mixture, a concentration of one or more reactants in a reaction mixture, an order of addition of one or more reactants to the reaction mixture; applying an electric field while forming the precipitated particles; or any combination thereof. Techniques for utilizing an electric field when forming precipitated particles are discussed further hereinbelow. Utilization of these techniques in combination with the use of a carbohydrate-based material may allow further tailoring of the size and morphology of the precipitated particles to be realized.

Accordingly, in more particular embodiments, methods of the present disclosure may comprise: forming precipitated particles in the presence of a carbohydrate-based material, such that the precipitated particles are substantially non-spherical in shape, are about 1 micron or under in size, or any combination thereof; and introducing a wellbore circulation fluid comprising a plurality of the precipitated particles into a wellbore penetrating a subterranean formation. The wellbore circulation fluid may display one or more of decreased particle sag, increased viscosity, increased yield strength, or increased fluid loss control compared to a wellbore circulation fluid comprising an equivalent concentration of substantially spherical weighting particles of like type. In more specific embodiments, the wellbore circulation fluid may be introduced into the wellbore during a drilling operation.

In still other various embodiments of the present disclosure, precipitated particles may be formed in the presence of an electric field. The electric field may impact the morphology and size of the precipitated particles that are obtained. The electric field may be an alternating current (AC) electric field or a direct current (DC) electric field. The electric field may be applied continuously during formation of the precipitated particles, or it may be pulsed, such that the electric field is applied non-continuously. Oscillatory pulses (featuring both positive and negative voltages) and exponential pulses (featuring either positive or negative voltages but not both) may be used for this purpose. When pulsed, the pulse rate may range between about 1 and about 180 pulses per second. In some embodiments, a magnitude of the electric field may be varied while forming the precipitated particles, and in other embodiments, a magnitude of the electric field may remain constant while forming the precipitated particles. Further parameters that may be modulated in order to vary the applied electric field, with or without altering the field's magnitude, include, for example, modulating one or more of voltage, amperage, frequency and temperature.

Advantageously, the methods of the present disclosure allow changes in the size and/or morphology of the precipitated particles to be realized by applying an electric field during a precipitation reaction. However, if further regulation of the size and/or morphology of the precipitated particles is needed, the precipitated particles may be formed in the presence of a charged polymer while applying the electric field. Both cationic and anionic charged polymers may be used for this purpose.

Although the electric field may be applied directly to the reaction mixture in which the precipitated particles are being formed (i.e., via placing electrodes in the reaction mixture), it may be more desirably applied to the reaction mixture indirectly. That is, in some embodiments, the electric field may be applied external to the reaction mixture in which the precipitated particles are being formed. For example, electrodes may be placed outside of a reaction vessel in which the precipitated particles are being formed, thereby creating an electric field when energized. The precipitated particles are then formed in the presence of the electric field without being directly exposed to an electrical current.

Figure 7C:
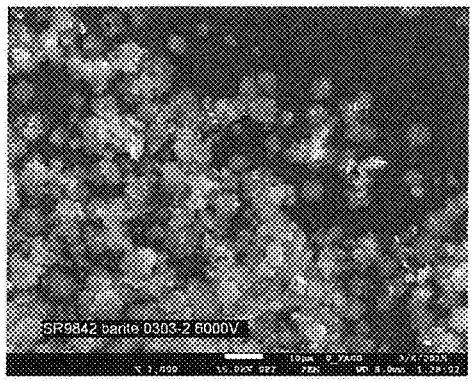
Figure 7D:
Figure 7E:
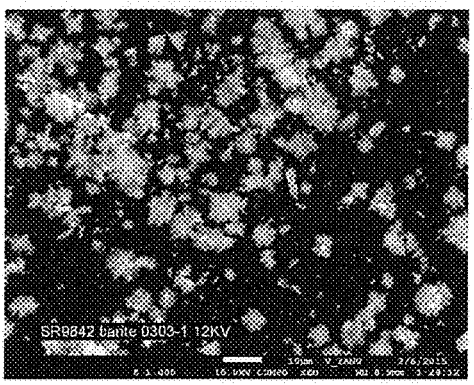
Figure 7F:
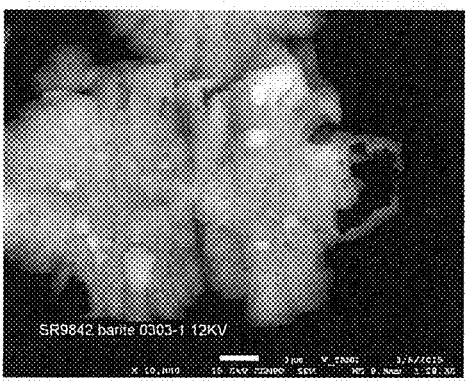

FIGS. 7A-7F show illustrative effects of forming precipitated particles in the presence of an applied AC electric field. Specifically, these FIGURES demonstrate the effects of forming precipitated barium sulfate particles in the absence of an applied AC electric field and in the presence of applied AC electric fields of varying magnitudes. FIG. 7A (1,000× magnification) and 7B (10,000× magnification) show barium sulfate particles that were precipitated in the absence of an applied electric field (0 V electrical potential applied). As shown in FIGS. 7A and 7B, flakes or platelets were produced in the absence of an applied electric field, and the median particle size was 2.97 microns. The corresponding $d_{90}$ particle size was 5.33 microns. In contrast, when the applied electrical potential was increased to 6,000 V, the median particle size increased to 5.65 microns and the particle morphology changed considerably (FIGS. 7C AND 7D). For example, the particle morphology was snowflake-like in FIG. 7D, with a plate-like structure and patterned arms. The $d_{90}$ particle size was 10.4 microns under these conditions. Further slight changes in the particle size and morphology occurred upon increasing the applied electrical potential to 12,000 V (FIGS. 7E and 7F). Under these conditions, the median particle size was 5.95 microns and the $d_{90}$ particle size was 12.6 microns. In an illustrative precipitation reaction, 1 mmol of $BaCl_2$ solution (2 mL of 0.5 M solution) was added in a glass tube with 60 mL deionized water. Compressed air was introduced for agitation during the precipitation reaction, and the glass tube was placed in an electric field while a 1 mmol $Na_2SO_4$ solution was added at a rate of 5 mL/hr.

In additional embodiments, methods for forming precipitated particles in the presence of an electric field may further comprise modulating one or more of a temperature of the reaction mixture, a concentration of one or more reactants in a reaction mixture, an order of addition of one or more reactants to the reaction mixture; forming the precipitated particles in the presence of a carbohydrate-based material; or any combination thereof. Utilization of these techniques in combination with an applied electric field may allow further tailoring of the size and morphology of the precipitated particles to be realized.

Accordingly, in more particular embodiments, methods of the present disclosure may comprise: forming precipitated particles while applying an electric field during a precipitation reaction, such that the precipitated particles are substantially non-spherical in shape, are about 1 micron or under in size, or any combination thereof; and introducing a wellbore circulation fluid comprising a plurality of the precipitated particles into a wellbore penetrating a subterranean formation. The wellbore circulation fluid may display one or more of decreased particle sag, increased viscosity, increased yield strength, or increased fluid loss control compared to a wellbore circulation fluid comprising an equivalent concentration of substantially spherical weighting particles of like type. In more specific embodiments, the wellbore circulation fluid may be introduced into the wellbore during a drilling operation.

In still other various embodiments of the present disclosure, precipitated particles may be formed by growing the precipitated particles upon a plurality of lower-quality seed particles of similar predominant chemical composition. Specifically, such precipitated particles may comprise a core comprising a seed particle and a surface coating comprising a precipitated substance upon the seed particle. Without limitation, such precipitation techniques may be applied in order to regulate the density of the precipitated particles, to increase the purity of the precipitated particles, or any combination thereof, particularly when a predominant component of the seed particles and the precipitated substance are the same. The seed particle and the surface coating may comprise the same predominant material.

In more particular embodiments of the present disclosure, the precipitated particles may comprise barite seed particles having a surface coating of precipitated barium sulfate thereon. The precipitated barium sulfate may increase the density and/or purity of the barite seed particles, thereby allowing lower quality barite sources to be used. The abrasiveness of lower quality barite particles may also be decreased by growing a barium sulfate surface coating thereon. The barite seed particles may be produced in any suitable manner, such as through grinding a sample obtained from a suitable barite source, and they may be produced in any size. In addition, any precipitation technique may be used for forming the surface coating comprising barium sulfate thereon, such as any of the illustrative precipitation techniques disclosed herein.

Accordingly, the present disclosure provides, in some embodiments, compositions comprising precipitated barium sulfate particles according to the description above. More specifically, the compositions may comprise precipitated particles comprising barite seed particles having a surface coating of precipitated barium sulfate thereon, in which the surface coating comprises a higher percentage of barium sulfate by weight than do the barite seed particles. Hence, the surface coating of barium sulfate may allow the particle quality to be enhanced, as discussed above. More specifically, by forming a surface coating of barium sulfate upon barite seed particles, the precipitated particles may have a specific gravity of about 4.2 or greater, an increased specific gravity relative to the barite seed particles, a decreased abrasiveness relative to the barite seed particles, a different morphology relative to the barite seed particles, or any combination thereof. Surface coatings suitable for accomplishing the foregoing may be continuous or discontinuous about the surface of the barite seed particles.

In further embodiments, compositions containing precipitated particles comprising barite seed particles and a surface coating of precipitated barium sulfate thereon may further comprise a carrier fluid in which the precipitated particles are dispersed. The combination of the precipitated particles and the carrier fluid may constitute at least a portion of a wellbore circulation fluid. Additional components may also be present in the wellbore circulation fluid, as discussed further above, and the wellbore circulation fluid may have a density residing within a range of about 6 pounds per gallon (ppg) and about 50 ppg, or any subrange thereof.

In further embodiments, methods for utilizing precipitated particles formed on barite seed particles may comprise: providing precipitated particles comprising barite seed particles having a surface coating of precipitated barium sulfate thereon, the surface coating comprising a higher percentage of barium sulfate by weight than do the barite seed particles; and introducing a wellbore circulation fluid comprising a plurality of the precipitated particles into a wellbore penetrating subterranean formation. In some embodiments, the wellbore circulation fluid containing the precipitated particles may be introduced into the wellbore during a drilling operation, although they may also be used in various other types of subterranean treatment operations in which particles are used.

In further embodiments, methods for forming and using precipitated particles containing barite seed particles may further comprise: dispersing the barite seed particles in a reaction mixture, and precipitating the barium sulfate onto the barite seed particles from the reaction mixture. In more specific embodiments, the reaction mixture may comprise an aqueous reaction mixture. Moreover, any suitable technique may be used for precipitating the barium sulfate onto the barite seed particles. That is, any of the precipitation techniques described herein may be used to form the surface coating, or uncontrolled precipitation techniques may be utilized to realize at least some of the features discussed above. Accordingly, in more specific embodiments, methods of the present disclosure may further comprise modulating one or more of a temperature of the reaction mixture, a concentration of one or more reactants in the reaction mixture, an order of addition of one or more reactants in the reaction mixture; forming the precipitated particles in the presence of an applied electric field; forming the precipitated particles in the presence of a carbohydrate-based material; or any combination thereof.

Figure 8A:
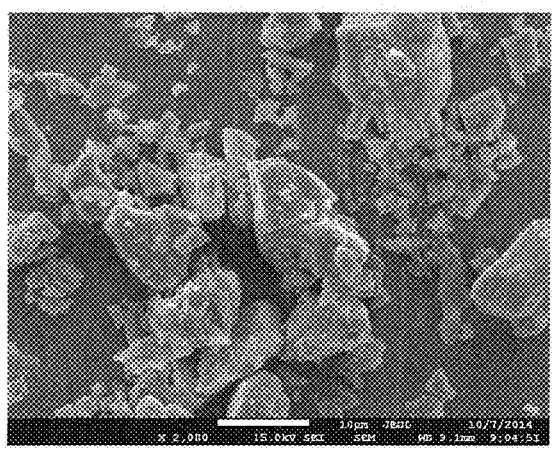
FIGS. 8A and 8B show images demonstrating illustrative effects of precipitating barium sulfate onto barite seed particles.
Figure 8B:
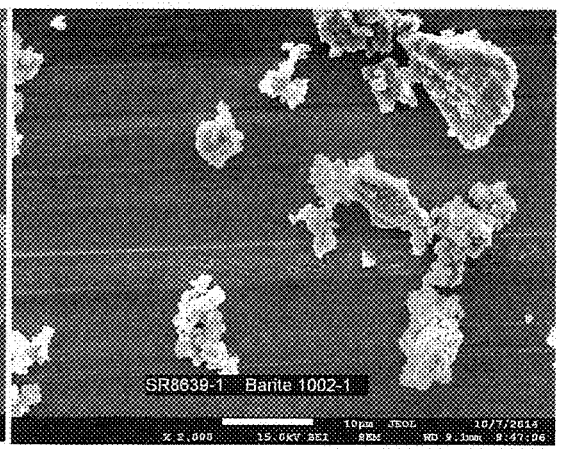
Figure 9:
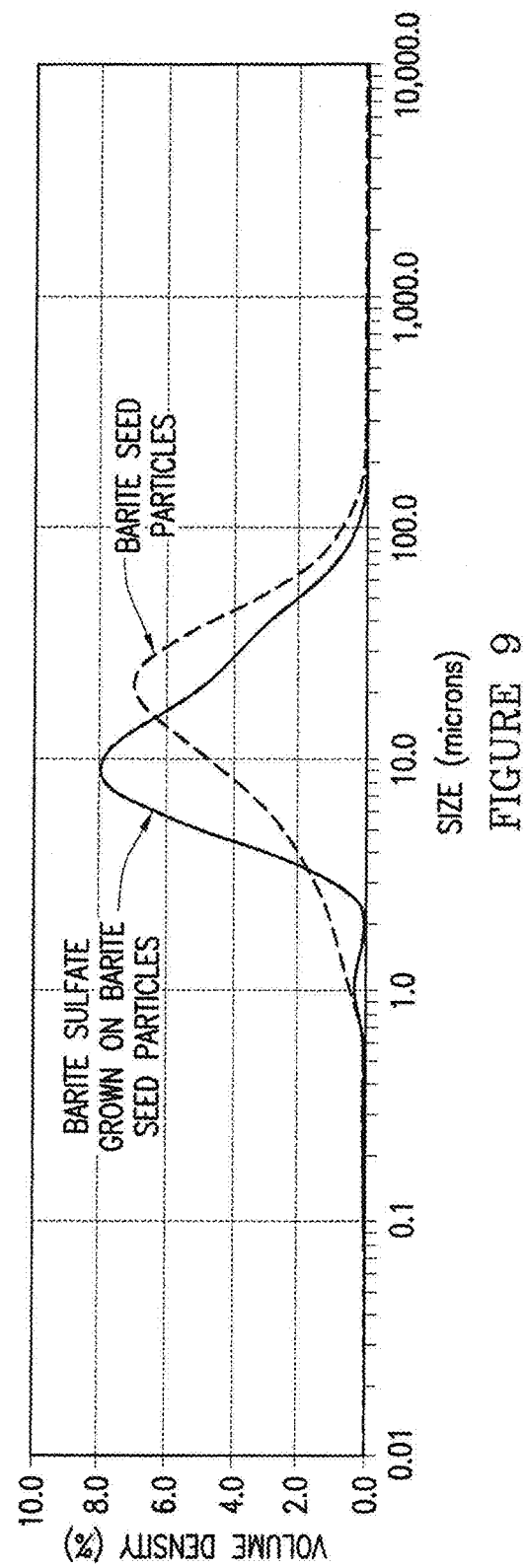
FIG. 9 shows an illustrative plot of the particle size distribution change following precipitation of barium sulfate on barite seed particles.

FIGS. 8A and 8B show images demonstrating illustrative effects of precipitating barium sulfate onto barite seed particles. FIG. 8A shows the barite seed particles before being further treated, and FIG. 8B show the resulting precipitated particles after forming barium sulfate on the barite seed particles. These figures show a change in the particle morphology following the precipitation reaction. Further, FIG. 9 shows an illustrative plot of the particle size distribution change following precipitation of barium sulfate on barite seed particles. As shown in FIG. 9, the particle size range remained approximately the same. It is believed that the disappearing tail of the original particle size distribution is due to more favorable precipitation on the smaller barite seed particles, thereby resulting in a smaller mean particle size for the precipitated particles than the original barite seed particles.

In further embodiments, the precipitated particles may be additionally processed to tailor their as-precipitated size, shape, reactivity, and/or purity. Illustrative techniques may include, for example, grinding, sonicating, calcining, coating, the like and any combination thereof.

In some embodiments, a coating may be formed on the precipitated particles to further tailor their size and chemical properties. The coating may comprise a different substance than the precipitated particles, such that they are substantially heterogeneous following coating. The technique used for coating the precipitated particles and the coating substance are not considered to be particularly limited.

In other non-limiting embodiments, the precipitated particles may be calcined by heating under an inert gas, air, or a reactive atmosphere to further modify the properties of the precipitated particles. Calcination may be employed, for example, when precipitated particles with a desired composition may not be formed directly through precipitation (e.g., an oxide).

In still other various embodiments, the precipitated particles may be further ground to tailor their size and/or morphology. When performed, the grinding process used for further tailoring the precipitated particles is not believed to be particularly limited.

In still other various embodiments, the precipitated particles may be combined with a ground mineral in order to produce a particle composition having more favorable properties than that of the original ground mineral. For example, precipitated barium sulfate particles may be combined with ground barite particles to raise the original purity of the barite particles and/or decrease their overall abrasiveness. The ground mineral may be the same as or different than the substance comprising the precipitated particles.

Although any wellbore circulation fluid may comprise the precipitated particles described herein, inclusion of the precipitated weighting particulates during a drilling operation may be particularly desirable. That it, the precipitated particles described herein may be incorporated within a drilling fluid. In particular, precise control of a drilling fluid's density and viscosity may be desirable to prevent blowouts and formation damage from occurring, while still ensuring that the drilling fluid maintains sufficient viscosity to convey drill cuttings from the wellbore. Further disclosure regarding illustrative drilling operations follows herebelow.

In addition to drilling operations, including managed-pressure drilling operations and dual-gradient drilling operations, the precipitated particles of the present disclosure may be utilized in a variety of other wellbore operations. Without limitation, such other wellbore operations may include, for example, tripping operations, logging operations, lost circulation operations, stimulation operations, sand control operations, completion operations, acidizing operations, scale inhibiting operations, water-blocking operations, clay stabilizer operations, fracturing operations, gravel packing operations, wellbore strengthening operations, and sag control operations. The precipitated particles and wellbore circulation fluids of the present disclosure may be utilized in such operations in full-scale treatment operations, or they may be introduced to the wellbore in a pill. As used herein, the term "pill" will refer to a relatively small volume of specially prepared wellbore circulation fluid placed in the wellbore before a main treatment operation.

In other various embodiments, the precipitated particles described herein and their associated wellbore circulation fluids may be used in cementing operations. As used herein, the term "cementing operation" will refer to a subterranean operation in which a fluid composition is placed in a wellbore and/or a subterranean formation and sets therein to form a hardened mass. The fluid composition may comprise one or more of hydraulic cements, construction cements, precipitated particles, polymers, and any combination thereof. Suitable polymers may include, for example, epoxy resins, latexes, or any combination thereof.

Suitable cementing operations may include both primary cementing operations (e.g., forming cement sheaths in a wellbore annulus or forming wellbore plugs for zonal isolation or fluid diversion) and remedial cementing operations (e.g., squeeze operations, repairing and/or sealing microannuli and/or cracks in a hardened mass, or forming plugs). The precipitated particles described herein may be present in a cement composition itself or in a spacer fluid preceding or anteceding the cement composition. For example, a cementing operation may utilize, in order, (1) a first spacer fluid, (2) a cement composition, (3) an optional second spacer fluid, and (4) a displacement fluid. Any of these fluids may comprise the precipitated particles described herein. In some embodiments, the successive fluids may be formulated such that each subsequent fluid has a higher density that its predecessor, which may be accomplished, at least in part, by utilizing the precipitated particles described herein. The precipitated particles, if used, in the successive fluids of a cementing operation may utilize the same type of precipitated particles, or the precipitated particles may be different. Different particles may be of the same predominant chemical substance but have a differing particle size or morphology, or precipitated particles comprising an entirely different chemical substance altogether may be utilized. In some embodiments, the hardened mass formed in a cementing operation may be at least partially degradable, either due to the nature of the cement composition itself and/or due to the nature of the precipitated particles which may be present therein. Further disclosure regarding illustrative cementing operations follows hereinafter.

As mentioned previously, the precipitated particles and associated wellbore circulation fluids of the present disclosure may be utilized in a cementing operation. In addition to the disclosure provided above, illustrative cementing operations are further described hereinafter.

In various embodiments, systems configured for preparing, transporting, and delivering the wellbore circulation fluids associated with a cementing operation are described herein. In various embodiments, the systems can comprise a pump fluidly coupled to a tubular (e.g., a casing, drill pipe, production tubing, coiled tubing, and the like) extending into a wellbore penetrating a subterranean formation. The tubular may be configured to circulate or otherwise convey a cementing fluid or other wellbore circulation fluid associated with a cementing operation to a downhole location. The cementing fluid and/or any wellbore circulation fluids associated with the cementing operation may comprise precipitated particles of the present disclosure. The pump may be, for example, a high pressure pump or a low pressure pump, which may depend on, inter alia, the viscosity and density of the cementing fluid or other associated wellbore circulation fluids, the type cementing operation being conducted, and the like.

In some embodiments, the systems for conducting the cementing operation may further comprise a mixing tank arranged upstream of the pump and in which the cementing fluid or other associated wellbore circulation fluid is formulated. In various embodiments, the pump (may convey the cementing fluid or other associated wellbore circulation fluid from the mixing tank or other source to the tubular. For example, in alternative embodiments, the cementing fluid or other associated wellbore circulation fluid can be formulated offsite and transported to a worksite, in which case the cementing fluid or other associated wellbore circulation fluid may be introduced to the tubular via the pump directly from a transport vehicle, shipping container, or transport pipeline. In yet other embodiments, the cementing fluid or other associated wellbore circulation fluid may be formulated on the fly at the well site where components of the cementing fluid or other associated wellbore circulation fluid are pumped from a transport structure and mixed during introduction into the tubular. In any case, the cementing fluid or other associated wellbore circulation fluid may be drawn into the pump, elevated to an appropriate pressure, and then introduced into the tubular for delivery downhole.

Figure 10:
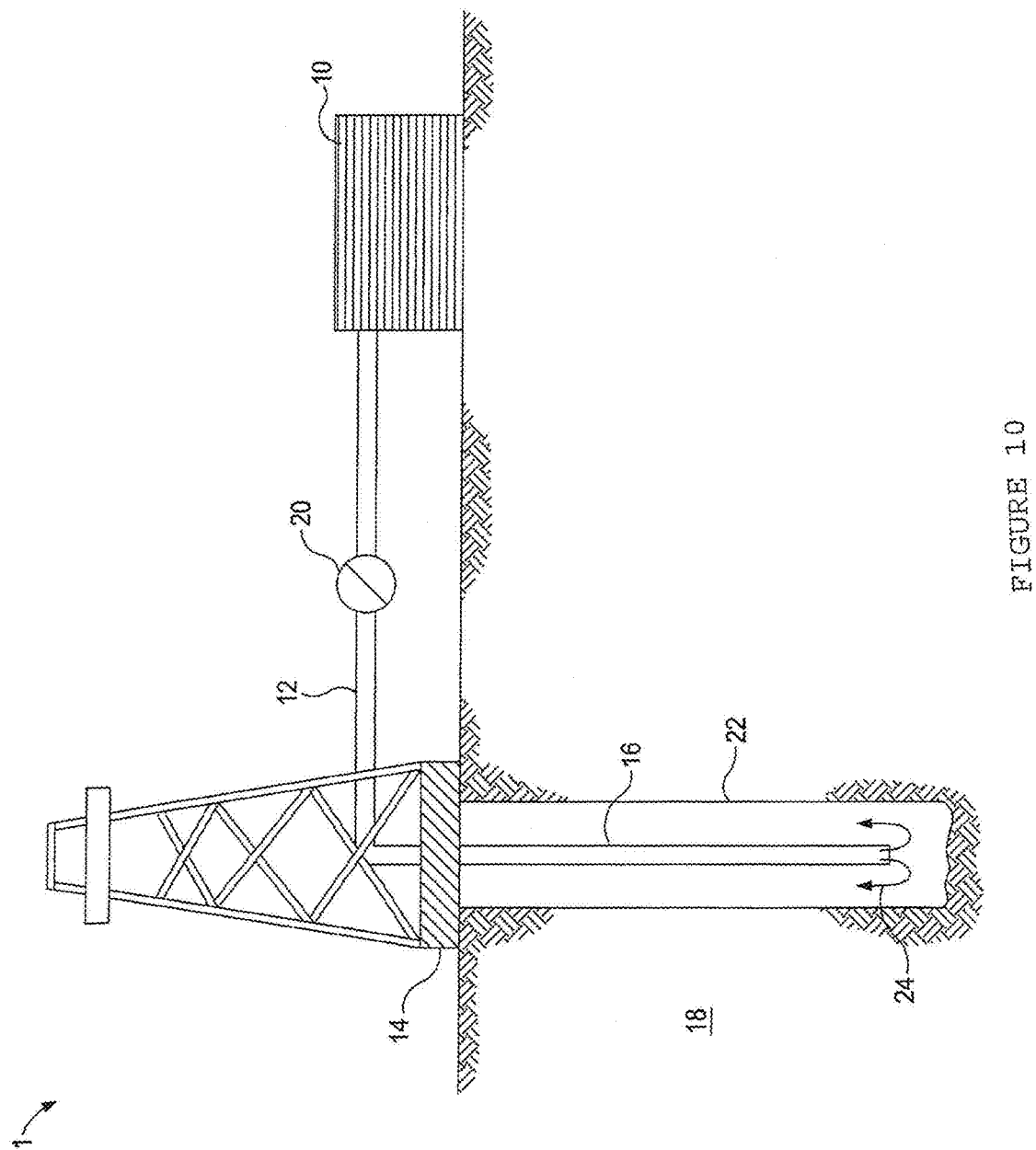
FIG. 10 shows an illustrative schematic of a system that can deliver a wellbore circulation fluid of the present disclosure to a downhole location, according to one or more embodiments.

FIG. 10 shows an illustrative schematic of a system that can deliver a cementing fluid or other associated wellbore circulation fluid of the present disclosure to a downhole location, according to one or more embodiments. It should be noted that while FIG. 10 generally depicts a land-based system, it is to be recognized that like systems may be operated in subsea locations as well. As depicted in FIG. 10, system 1 may include mixing tank 10, in which a cementing fluid or other associated wellbore circulation fluid of the present disclosure may be formulated. Again, in some embodiments, the mixing tank 10 may represent or otherwise be replaced with a transport vehicle or shipping container configured to deliver or otherwise convey the cementing fluid or other associated wellbore circulation fluid to the well site. The cementing fluid or other associated wellbore circulation fluid may be conveyed via line 12 to wellhead 14, where the cementing fluid or other associated wellbore circulation fluid enters tubular 16 (e.g., a casing, drill pipe, production tubing, coiled tubing, and the like), which extends into wellbore 22 and penetrates subterranean formation 18. Upon being ejected from tubular 16, the cementing fluid or other associated wellbore circulation fluid may subsequently return up the wellbore in the annulus between the tubular 16 and the wellbore 22 as indicated by flow lines 24. In other embodiments, the cementing fluid may be reverse pumped through the annulus and up tubular 16 back to the surface without departing from the scope of this disclosure. It is to be recognized that system 1 is merely exemplary in nature and various additional components may be present that have not necessarily been depicted in FIG. 10 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One having ordinary skill in the art and the benefit of this disclosure will recognize that changes may be made to the system described in FIG. 10 to provide for various types of cementing operations such as squeeze operations, reverse cementing operations, and the like.

It is also to be recognized that the disclosed cementing fluid or other associated wellbore circulation fluid may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 10.

As also mentioned above, the precipitated particles and wellbore circulation fluids of the present disclosure may be utilized in a drilling process. Illustrative disclosure regarding such drilling processes follows hereinbelow.

Figure 11:
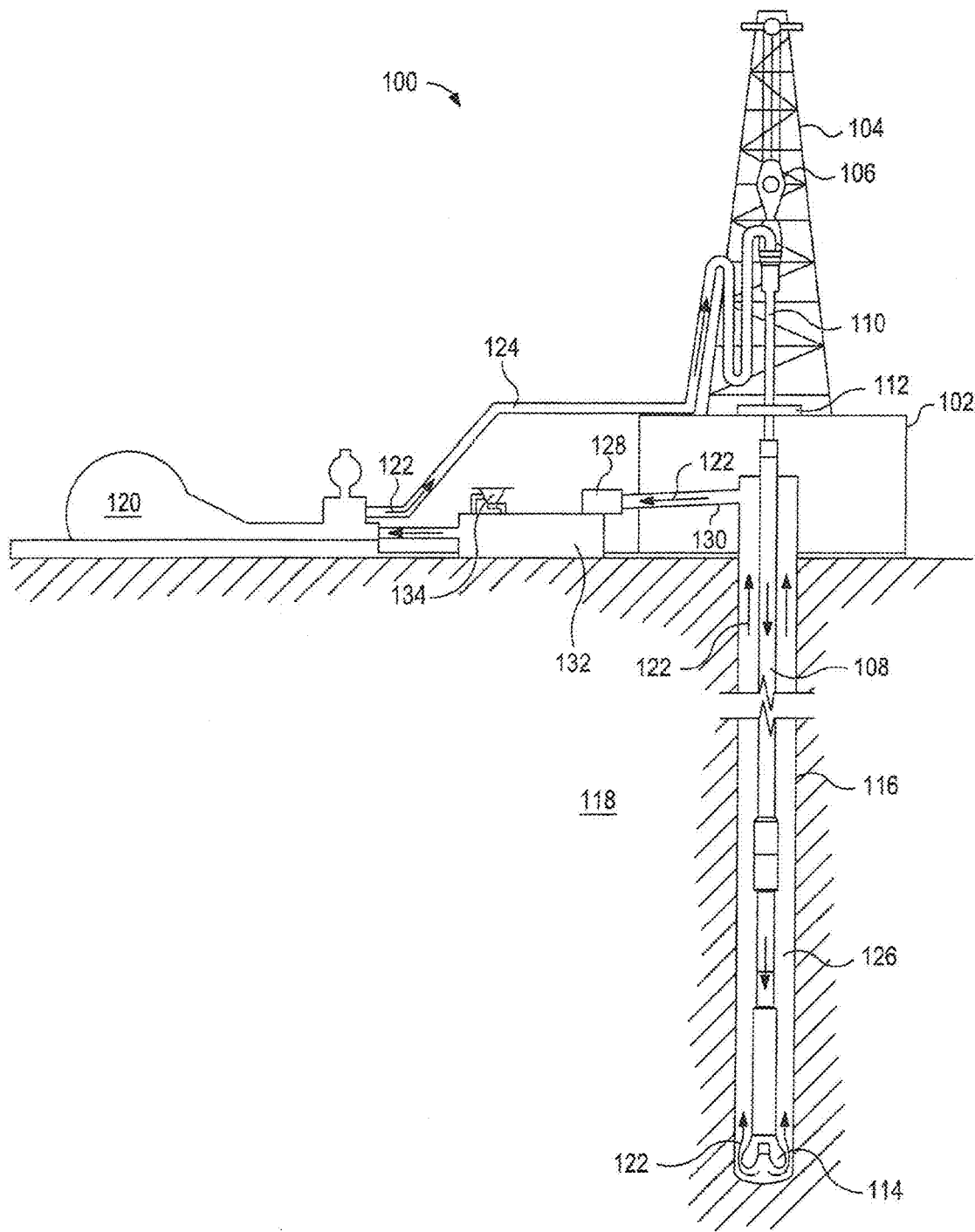
FIG. 11 shows an illustrative schematic of a drilling assembly in which wellbore circulation fluids of the present disclosure may be introduced.

FIG. 11 shows an illustrative schematic of a drilling assembly in which wellbore circulation fluids of the present disclosure may be introduced. While FIG. 11 generally depicts a land-based drilling assembly, one having ordinary skill in the art will readily recognize that the principles described herein are equally applicable to subsea drilling operations that employ floating or sea-based platforms and rigs, without departing from the scope of the disclosure.

As illustrated, drilling assembly 100 may include drilling platform 102 that supports derrick 104 having traveling block 106 for raising and lowering drill string 108. Drill string 108 may include, but is not limited to, drill pipe and coiled tubing, as generally known by one having ordinary skill in the art. Kelly 110 supports drill string 108 as it is lowered through rotary table 112. Drill bit 114 is attached to the distal end of drill string 108 and is driven either by a downhole motor and/or via rotation of drill string 108 from the well surface. As drill bit 114 rotates, it creates borehole 116 that penetrates various subterranean formations 118.

Pump 120 (e.g., a mud pump) circulates drilling fluid 122 through feed pipe 124 and to kelly 110, which conveys drilling fluid 122 downhole through the interior of drill string 108 and through one or more orifices in drill bit 114. Drilling fluid 122 is then circulated back to the surface via annulus 126 defined between drill string 108 and the walls of borehole 116. At the surface, the recirculated or spent drilling fluid 122 exits annulus 126 and may be conveyed to one or more fluid processing unit(s) 128 via interconnecting flow line 130. After passing through fluid processing unit(s) 128, a "cleaned" drilling fluid 122 is deposited into nearby retention pit 132 (i.e., a mud pit). While illustrated as being arranged at the outlet of wellbore 116 via annulus 126, one having ordinary skill in the art will readily appreciate that fluid processing unit(s) 128 may be arranged at any other location in drilling assembly 100 to facilitate its proper function, without departing from the scope of the disclosure.

Drilling fluid 122 may be formulated in mixing hopper 134 that is communicably coupled to or otherwise in fluid communication with retention pit 132. Mixing hopper 134 may include, but is not limited to, mixers and related mixing equipment known to a person having ordinary skill in the art. In at least one embodiment, for example, there could be more than one retention pit 132, such as multiple retention pits 132 in series. Moreover, retention pit 132 may be representative of one or more fluid storage facilities and/or units where drilling fluid 122 may be stored, reconditioned, and/or regulated.

Drilling fluid 122 may directly or indirectly affect the components and equipment of drilling assembly 100. For example, drilling fluid 122 may directly or indirectly affect fluid processing unit(s) 128 which may include, but are not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. Fluid processing unit(s) 128 may further include one or more sensors, gauges, pumps, compressors, and the like used to store, monitor, regulate, and/or recondition the exemplary drilling fluids.

Drilling fluid 122 may directly or indirectly affect pump 120, which representatively includes any conduits, pipelines, trucks, tubulars, and/or pipes used to fluidically convey the drilling fluids downhole, any pumps, compressors, or motors (e.g., topside or downhole) used to drive the drilling fluids into motion, any valves or related joints used to regulate the pressure or flow rate of the drilling fluids, and any sensors (i.e., pressure, temperature, flow rate, etc.), gauges, and/or combinations thereof, and the like. Drilling fluid 122 may also directly or indirectly affect mixing hopper 134 and retention pit 132 and their assorted variations.

Drilling fluid 122 may also directly or indirectly affect the various downhole equipment and tools that may come into contact with the drilling fluids such as, but not limited to, drill string 108, any floats, drill collars, mud motors, downhole motors and/or pumps associated with drill string 108, and any MWD/LWD tools and related telemetry equipment, sensors or distributed sensors associated with drill string 108. Drilling fluid 122 may also directly or indirectly affect any downhole heat exchangers, valves and corresponding actuation devices, tool seals, packers and other wellbore isolation devices or components, and the like associated with wellbore 116. Drilling fluid 122 may also directly or indirectly affect drill bit 114, which may include, but is not limited to, roller cone bits, PDC bits, natural diamond bits, any hole openers, reamers, coring bits, and the like.

While not specifically illustrated herein, drilling fluid 122 may also directly or indirectly affect any transport or delivery equipment used to convey the drilling fluids to drilling assembly 100 such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

Embodiments disclosed herein include:

A. Methods for utilizing precipitated particles in a wellbore circulation fluid. The methods comprise: selecting precipitation conditions for producing precipitated particles that are substantially non-spherical in shape, are about 1 micron or under in size, or any combination thereof; forming the precipitated particles from a reaction mixture under the precipitation conditions without using a polymeric dispersant; wherein the precipitation conditions include one or more of the following: i) modulating one or more of a temperature of the reaction mixture, a concentration of one or more reactants in the reaction mixture, or an order of addition of one or more reactants to the reaction mixture, ii) applying an electric field to the reaction mixture, or iii) including a carbohydrate-based material in the reaction mixture; and introducing a wellbore circulation fluid comprising a plurality of the precipitated particles into a wellbore penetrating a subterranean formation.

B. Methods for using precipitated particles formed in the presence of an electric field. The methods comprise: forming precipitated particles while applying an electric field to a reaction mixture during a precipitation reaction, such that the precipitated particles are substantially non-spherical in shape, are about 1 micron or under in size, or any combination thereof; and introducing a wellbore circulation fluid comprising a plurality of the precipitated particles into a wellbore penetrating a subterranean formation.

C. Methods for using precipitated particles formed in the presence of a carbohydrate-based material. The methods comprise: forming precipitated particles from a reaction mixture in the presence of a carbohydrate-based material, such that the precipitated particles are substantially non-spherical in shape, are about 1 micron or under in size, or any combination thereof; and introducing a wellbore circulation fluid comprising a plurality of the precipitated particles into a wellbore penetrating a subterranean formation.

D. Methods for using precipitated particles formed upon barite seed particles. The methods comprise: providing precipitated particles comprising barite seed particles having a surface coating of precipitated barium sulfate thereon, the surface coating comprising a higher percentage of barium sulfate by weight than do the barite seed particles; and introducing a wellbore circulation fluid comprising a plurality of the precipitated particles into a wellbore penetrating a subterranean formation.

E. Compositions comprising precipitated particles. The compositions comprise: precipitated particles comprising barite seed particles having a surface coating of precipitated barium sulfate thereon, the surface coating comprising a higher percentage of barium sulfate by weight than do the barite seed particles.

Each of embodiments A-E may have one or more of the following additional elements in any combination:

Element 1: wherein the wellbore circulation fluid is introduced into the wellbore during a drilling operation.

Element 2: wherein the wellbore circulation fluid displays one or more of decreased particle sag, increased viscosity, increased yield strength, or increased fluid loss control compared to a wellbore circulation fluid comprising an equivalent concentration of substantially spherical particles of like type.

Element 3: wherein the precipitation conditions comprise including a carbohydrate-based material in the reaction mixture and the carbohydrate-based material comprises a sugar, a sugar alcohol, a sugar acid, or any combination thereof.

Element 4: wherein the precipitation conditions comprise applying an electric field to the reaction mixture and one or more of voltage, amperage, frequency, or temperature are further modulated.

Element 5: wherein the electric field is applied external to the reaction mixture in which the precipitated particles are being formed.

Element 6: wherein a magnitude of the electric field is varied while forming the precipitated particles.

Element 7: wherein the precipitated particles comprise barium sulfate, calcium carbonate, or any combination thereof.

Element 8: wherein the method further comprises modulating one or more of voltage, amperage, frequency, or temperature.

Element 9: wherein the precipitated particles are formed in the presence of a charged polymer or a sugar.

Element 10: wherein the method further comprises modulating one or more of a temperature of the reaction mixture, a concentration of one or more reactants in the reaction mixture, or an order of addition of one or more reactants to the reaction mixture; forming the precipitated particles in the presence of a carbohydrate-based material; or any combination thereof.

Element 11: wherein the carbohydrate-based material comprises a sugar, a sugar alcohol, a sugar acid, or any combination thereof.

Element 12: wherein the method further comprises modulating one or more of a temperature of the reaction mixture, a concentration of one or more reactants in the reaction mixture, or an order of addition of one or more reactants to the reaction mixture; forming the precipitated particles in the presence of an applied electric field; or any combination thereof.

Element 13: wherein the precipitated particles have a specific gravity of about 4.2 or greater, an increased specific gravity relative to the barite seed particles, a decreased abrasiveness relative to the barite seed particles, a different morphology relative to the barite seed particles, or any combination thereof.

Element 14: wherein providing the precipitated particles comprises: dispersing the barite seed particles in a reaction mixture; and precipitating the barium sulfate onto the barite seed particles from the reaction mixture.

Element 15: wherein the method further comprises modulating one or more of a temperature of the reaction mixture, a concentration of one or more reactants in the reaction mixture, or an order of addition of one or more reactants to the reaction mixture; forming the precipitated particles in the presence of an applied electric field; forming the precipitated particles in the presence of a carbohydrate-based material; or any combination thereof.

Element 16: wherein the composition further comprises a carrier fluid in which the precipitated particles are dispersed.

By way of non-limiting example, exemplary combinations applicable to A-E include:

The method of A in combination with elements 1 and 2.
The method of A in combination with elements 2 and 3.
The method of A in combination with elements 2 and 4.
The method of A in combination with elements 4 and 5.
The method of A in combination with elements 4 and 6.
The method of A in combination with elements 4-6.
The method of A in combination with elements 2 and 7.
The method of A in combination with elements 3 and 7.
The method of A in combination with elements 4 and 7.
The method of B in combination with elements 5 and 8.
The method of B in combination with elements 6 and 8.
The method of B in combination with elements 8 and 9.
The method of B in combination with elements 8 and 10.
The method of B in combination with elements 1 and 8.
The method of C in combination with elements 2 and 11.
The method of C in combination with elements 2 and 12.
The method of C in combination with elements 1 and 11.
The method of D in combination with elements 2 and 13.
The method of D in combination with elements 13 and 14.
The method of D in combination with elements 2 and 14.
The method of D in combination with elements 1 and 13.
The composition of E in combination with elements 13 and 14.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    selecting precipitation conditions for producing precipitated particles that are non-spherical in shape and are between about 1 micron and about 100 microns in size;
    forming the precipitated particles from a reaction mixture under the precipitation conditions without using a polymeric dispersant; and
    introducing a wellbore circulation fluid comprising a plurality of the precipitated particles into a wellbore penetrating a subterranean formation;
    wherein the precipitation conditions comprise including a carbohydrate-based material in the reaction mixture and the carbohydrate-based material comprises a sugar, a sugar alcohol, a sugar acid, or any combination thereof,
    wherein the carbohydrate-based material is selected to control the shape of the precipitated particles to decrease particle sag of the wellbore circulation fluid,
    wherein the non-spherical shape is selected from the group consisting of ovular-shaped, discus-shaped, platelet-shaped, flake-shaped, snowflake-shaped, toroidal-shaped, dendritic-shaped, needle-shaped, acicular-shaped, rod-shaped, prismatic-shaped, or spiked variants of any of these shapes, and
    wherein a $d_{90}$ particle size of the precipitated particles is greater than or equal to 1.5× a median particle size of the precipitated particles and less than or equal to 4× the median particle size of the precipitated particles.

2. A method comprising:
    selecting precipitation conditions for producing precipitated particles that are non-spherical in shape and are between about 1 micron and about 100 microns in size;
    forming the precipitated particles from a reaction mixture under the precipitation conditions without using a polymeric dispersant; and
    introducing a wellbore circulation fluid comprising a plurality of the precipitated particles into a wellbore penetrating a subterranean formation;
    wherein the precipitation conditions comprise applying an electric field to the reaction mixture and modulating one or more of voltage, amperage, frequency, or temperature,
    wherein the electric potential of the applied electric field is selected to control the shape of the precipitated particles to decrease particle sag of the wellbore circulation fluid,
    wherein the non-spherical shape is selected from the group consisting of ovular-shaped, discus-shaped, platelet-shaped, flake-shaped, snowflake-shaped, toroidal-shaped, dendritic-shaped, needle-shaped, acicular-shaped, rod-shaped, prismatic-shaped, or spiked variants of any of these shapes, and
    wherein a $d_{90}$ particle size of the precipitated particles is greater than or equal to 1.5× a median particle size of the precipitated particles and less than or equal to 4× the median particle size of the precipitated particles.

3. The method of claim 2, wherein the electric field is applied to the reaction mixture in which the precipitated particles are being formed via electrodes disposed outside of a reaction vessel containing the reaction mixture.

4. The method of claim 2, wherein a magnitude of the electric field is varied while forming the precipitated particles.

5. A method comprising:
    forming precipitated particles while applying an electric field to a reaction mixture during a precipitation reaction, such that the precipitated particles are non-spherical in shape and are between about 1 micron and about 100 microns in size; and
    introducing a wellbore circulation fluid comprising a plurality of the precipitated particles into a wellbore penetrating a subterranean formation,
    wherein the electric potential of the applied electric field is selected to control the shape of the precipitated particles to decrease particle sag of the wellbore circulation fluid,
    wherein the non-spherical shape is selected from the group consisting of ovular-shaped, discus-shaped, platelet-shaped, flake-shaped, snowflake-shaped, toroidal-shaped, dendritic-shaped, needle-shaped, acicular-shaped, rod-shaped, prismatic-shaped, or spiked variants of any of these shapes, and
    wherein a $d_{90}$ particle size of the precipitated particles is greater than or equal to 1.5× a median particle size of the precipitated particles and less than or equal to 4× the median particle size of the precipitated particles.

6. The method of claim 5, further comprising:
    modulating one or more of voltage, amperage, frequency, or temperature.

7. The method of claim 5, wherein the electric field is applied to the reaction mixture in which the precipitated particles are being formed via electrodes disposed outside of a reaction vessel containing the reaction mixture.

8. The method of claim 5, wherein a magnitude of the electric field is varied while forming the precipitated particles.

9. The method of claim 5, wherein the precipitated particles are formed in the presence of a charged polymer or a sugar.

10. The method of claim 5, wherein the wellbore circulation fluid is introduced into the wellbore during a drilling operation.

11. The method of claim 5, wherein the wellbore circulation fluid displays one or more of decreased particle sag, increased viscosity, increased yield strength, or increased fluid loss control compared to a wellbore circulation fluid comprising an equivalent concentration of substantially spherical particles of like type.

12. The method of claim 5, further comprising:
    modulating one or more of a temperature of the reaction mixture, a concentration of one or more reactants in the reaction mixture, or an order of addition of one or more reactants to the reaction mixture;

forming the precipitated particles in the presence of a carbohydrate-based material; or any combination thereof.

13. A method comprising:

forming precipitated particles from a reaction mixture in the presence of a carbohydrate-based material, such that the precipitated particles are non-spherical in shape and are between about 1 micron and about 100 microns in size; and introducing a wellbore circulation fluid comprising a plurality of the precipitated particles into a wellbore penetrating a subterranean formation, wherein the carbohydrate-based material is selected to control the shape of the precipitated particles to decrease particle sag of the wellbore circulation fluid, wherein the non-spherical shape is shape selected from the group consisting of ovular-shaped, discus-shaped, platelet-shaped, flake-shaped, snowflake-shaped, toroidal-shaped, dendritic-shaped, needle-shaped, acicular-shaped, rod-shaped, prismatic-shaped, or spiked variants of any of these shapes, and wherein a $d_{90}$ particle size of the precipitated particles is greater than or equal to 1.5× a median particle size of the precipitated particles and less than or equal to 4× the median particle size of the precipitated particles.

14. The method of claim 13, wherein the carbohydrate-based material comprises a sugar, a sugar alcohol, a sugar acid, or any combination thereof.

15. The method of claim 13, wherein the wellbore circulation fluid is introduced into the wellbore during a drilling operation.

16. The method of claim 13, wherein the wellbore circulation fluid displays one or more of decreased particle sag, increased viscosity, increased yield strength, or increased fluid loss control compared to a wellbore circulation fluid comprising an equivalent concentration of substantially spherical particles of like type.

17. The method of claim 13, further comprising:

modulating one or more of a temperature of the reaction mixture, a concentration of one or more reactants in the reaction mixture, or an order of addition of one or more reactants to the reaction mixture;

forming the precipitated particles in the presence of an applied electric field; or any combination thereof.

\* \* \* \* \*